(12) United States Patent
Forster

(10) Patent No.: US 10,587,724 B2
(45) Date of Patent: Mar. 10, 2020

(54) CONTENT SHARING WITH USER AND RECIPIENT DEVICES

(71) Applicant: Microsoft Technology Licensing, LLC, Redmond, WA (US)

(72) Inventor: Rowan Forster, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 489 days.

(21) Appl. No.: 15/160,867

(22) Filed: May 20, 2016

(65) Prior Publication Data

US 2017/0339249 A1 Nov. 23, 2017

(51) Int. Cl.
*H04L 29/08* (2006.01)
*G06Q 10/10* (2012.01)
*H04L 29/06* (2006.01)

(52) U.S. Cl.
CPC .......... *H04L 67/327* (2013.01); *G06Q 10/10* (2013.01); *H04L 65/601* (2013.01); *H04L 67/02* (2013.01); *H04L 67/142* (2013.01)

(58) Field of Classification Search
CPC .................................................. G06Q 10/10
See application file for complete search history.

(56) References Cited

U.S. PATENT DOCUMENTS

| | | | |
|---|---|---|---|
| 7,954,058 B2 | 5/2011 | Kalaboukis et al. | |
| 8,001,187 B2 | 8/2011 | Stochosky | |
| 8,533,284 B2 | 9/2013 | Shoemaker et al. | |
| 8,707,185 B2 | 4/2014 | Robinson et al. | |
| 8,832,190 B1 | 9/2014 | Leske et al. | |
| 9,104,302 B2 | 8/2015 | Chai et al. | |
| 9,852,399 B1* | 12/2017 | Casale | G06F 16/245 |
| 2006/0031779 A1 | 2/2006 | Theurer et al. | |
| 2006/0277255 A1* | 12/2006 | Orsolini | G06Q 10/10 |
| | | | 709/205 |
| 2007/0168340 A1* | 7/2007 | Mahoney | G06F 16/954 |
| 2007/0239755 A1* | 10/2007 | Mahoney | G06Q 10/10 |
| 2007/0240063 A1* | 10/2007 | Cheng | G06F 16/954 |
| | | | 715/741 |

(Continued)

OTHER PUBLICATIONS

"International Search Report and Written Opinion Issued in PCT Application No. PCT/US17/032774", dated Jul. 14, 2017, 10 Pages.

(Continued)

*Primary Examiner* — Aftab N. Khan
(74) *Attorney, Agent, or Firm* — Alleman Hall Creasman & Tuttle LLP

(57) ABSTRACT

Methods and systems for establishing a content sharing session between computing devices are disclosed. Prior to establishing the content sharing session: user selection input selecting displayed content is received; in response to the user selection input, a content sharing window is displayed comprising the content, interaction type selectors, and contact selectors; user contact input selecting at least one contact selector corresponding to a selected recipient is received; and user interaction input selecting an interaction type selector is received. At least in response to receiving user input, the content sharing session is established in which the selected content is provided to the recipient computing device for display. Recipient input is received from the recipient computing device during the sharing session.

18 Claims, 12 Drawing Sheets

(56) References Cited

U.S. PATENT DOCUMENTS

| | | | |
|---|---|---|---|
| 2008/0034038 A1 | 2/2008 | Ciudad et al. | |
| 2008/0307324 A1 | 12/2008 | Westen et al. | |
| 2009/0144377 A1* | 6/2009 | Kim | G06Q 10/10 709/206 |
| 2009/0300139 A1* | 12/2009 | Shoemaker | G06Q 10/10 709/217 |
| 2010/0070881 A1* | 3/2010 | Hanson | G06Q 10/06 715/753 |
| 2010/0131868 A1 | 5/2010 | Chawla et al. | |
| 2010/0192072 A1* | 7/2010 | Spataro | G06Q 10/107 715/753 |
| 2010/0262925 A1 | 10/2010 | Liu et al. | |
| 2011/0022662 A1* | 1/2011 | Barber-Mingo | G06Q 10/06 709/206 |
| 2013/0159429 A1* | 6/2013 | Nalliah | H04L 51/22 709/206 |
| 2015/0033148 A1 | 1/2015 | Kuchoor | |
| 2015/0149929 A1* | 5/2015 | Shepherd | H04L 65/403 715/753 |
| 2015/0242086 A1 | 8/2015 | Mindlin | |

OTHER PUBLICATIONS

"Samesurf Cobrowsing—Business Uses," Samesurf Website, Available Online at http://www.samesurf.com/uses-business.html#sales and http://www.samesurf.com/uses-business.html#support, Available as Early as Jan. 4, 2016, Retrieved Apr. 29, 2016, 6 pages.

"Samesurf", Published on: Jan. 12, 2016 Available at: http://www.samesurf.com/.

"Display Note", Published on: Feb. 21, 2014 Available at: http://displaynote.com/.

"Mikogo", Retrieved on: Feb. 4, 2016 Available at: https://www.mikogo.com/guide/screen-sharing/.

"ShareX", Published on: Dec. 25, 2015 Available at: https://getsharex.com/.

"Droplr", Retrieved on: Feb. 4, 2016 Available at: http://droplr.com/getting-started/screenshots.

"BlueJeans", Published on: Sep. 23, 2015 Available at: https://www.bluejeans.com/video-collaboration/screen-sharing.

"Interactive Content Sharing", Retrieved from: <<https://web.archive.org/web/20141117184809/http:/www.verishow.com:80/content-sharing>>, Retrieved on: Nov. 17, 2014, 9 Pages.

Campbell, Mikey, "ios 7 feature focus: AirDrop simplifies speedy local file transfer", Retrieved From: https://appleinsider.com/articles/13/09/18/ios-7-feature-focus-airdrop-simplifies-speedy-local-file-transfer ,Sep. 18, 2013, 5 Pages.

"Skype for Business Tips—Meet Now and Share a Presentation", Retrieved From: https://www.youtube.com/watch?v=_tXndFkzU1g, 2015, 4 Pages.

"Start an Immediate meeting Using Lync Meet Now", Retrieved From: https://www.youtube.com/watch?v=S5mukYa2JKU, 2013, 6 Pages.

"Start an Unscheduled online meeting or conference call", Retrieved From: https://support.office.com/en-us/article/start-an-unscheduled-online-meeting-or-conference-call-00753ee2-3cee-4862-85fc-989c6e8ac712, 2010, 3 Pages.

* cited by examiner

CONTENT SHARING WITH USER AND RECIPIENT DEVICES

BACKGROUND

Digital content may be exchanged between devices by sending a static representation of the content, such as an image file or a URL, from one device to another. A recipient may launch an application that opens or accesses the content received. Another approach may utilize a screen sharing application in which two or more devices run the application to display screen grabs from one of the devices.

SUMMARY

Systems and methods for establishing a content sharing session are disclosed herein. In one example a system comprises a user computing device comprising a processor and a display configured to display content. A content sharing program is executable by the processor and configured to, prior to establishing the content sharing session: receive user selection input selecting at least a portion of the content displayed on the display; in response to the user selection input, generate a content sharing window comprising the portion of the content, a plurality of user-selectable interaction type selectors, and a plurality of user-selectable contact selectors; receive user contact input selecting at least one of the user-selectable contact selectors that corresponds to a selected recipient; and receive user interaction input selecting one of the user-selectable interaction type selectors.

At least in response to receiving the user contact input and the user interaction input, the content sharing program establishes the content sharing session in which the portion of the content is provided to at least one recipient computing device associated with the selected recipient for display. During the content sharing session, recipient input is received from the at least one recipient computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
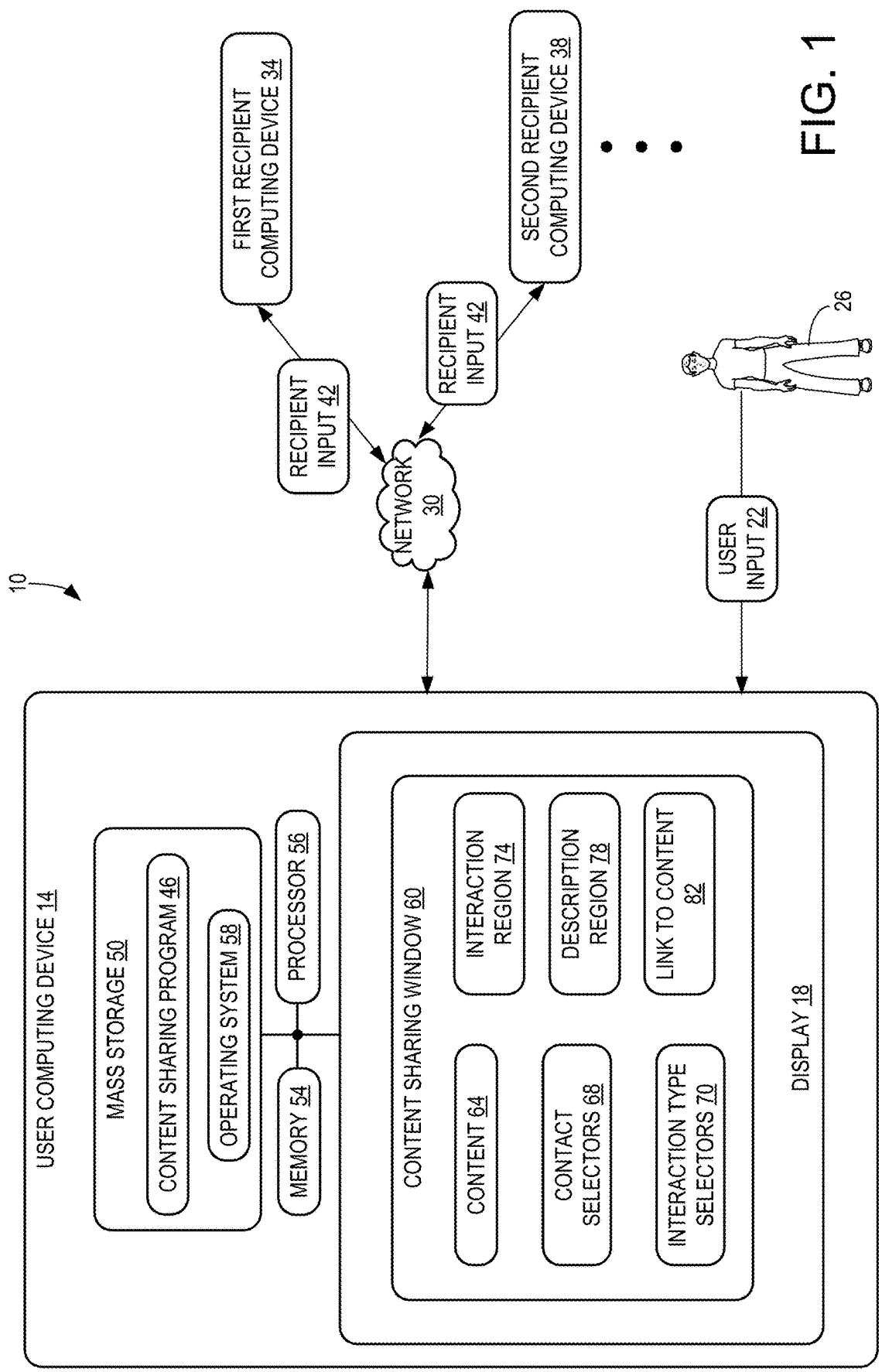
FIG. 1 shows a schematic representation of a system for establishing a content sharing session according to examples of the present disclosure.

FIG. 1 illustrates a system 10 for establishing a content sharing session according to examples of the present disclosure. The system 10 includes a user computing device 14. In different examples user computing device 14 may take a variety of forms, such as a tablet, notebook or laptop computer, desktop computer, smartphone or other portable communication device, wearable computer such as a head-mounted display device, etc.

As schematically shown in FIG. 1, the computing device 14 may comprise a display 18. In different examples, the display 18 may utilize any suitable display technology. The display 18 may be a touch-screen display configured to receive and detect touch input from a user, and may be resistive, capacitive, or optically based. In some examples the display 18 may be integrated with other components of the computing device 14 in a common enclosure. In other examples the display may be a standalone or separate display that is communicatively coupled to other components of the computing device 14.

In some examples the computing device 14 may comprise one or more sensor systems that may generate signals and other data responsive to detecting various inputs. Examples of sensor systems may include, for example, touch-sensitive display systems, microphones, depth camera input systems, global positioning systems (GPS), accelerometers, gyroscopes, magnetometers, inertial measurement units (IMU), etc. As described in more detail below, different user inputs 22 from a user 26 may be received by the user computing device 14.

User computing device 14 may be communicatively coupled to one or more other computing devices via a wired connection or a wireless connection to a network 30. In some examples, the network 30 may take the form of a local area network (LAN), wide area network (WAN), wired network, wireless network, personal area network, or a combination thereof, and may include the Internet.

In the example of FIG. 1, user computing device 14 is communicatively coupled via network 30 to a first recipient computing device 34, a second recipient computing device 38, and additional recipient computing devices (not shown). In other examples the user computing device 14 may be communicatively coupled to one, two or any suitable number of recipient computing devices.

As described in more detail below, one or more recipient computing devices may provide recipient input 42 via network 30 to the user computing device 14. In some examples, the recipient input 42 may comprise audio data, video data, text data and/or annotation data. In some examples, a recipient computing device may comprise a computing device that operates or supports a social networking service. In some examples, the user computing device 14 may communicate with one or more recipient computing devices via network 30 and a social networking service.

The user computing device 14 may comprise a content sharing program 46 stored in mass storage 50. The content sharing program 46 may be loaded into memory 54 and its instructions executed by processor 56 to perform one or more of the methods and processes for establishing a content sharing session as described herein. In some examples the content sharing program 46 may be executed at an operating system level and may form a portion of an operating system 58. In some examples the content sharing program 46 may comprise an application that is run via the operating system 58.

As described in more detail below, the content sharing program 46 may be executable by processor 56 to generate and display a content sharing window 60 on the display 18. The content sharing window 60 may comprise content 64 that a user may share with one or more others via their recipient computing devices. In some examples and as described in more detail below, the content sharing window 60 may comprise a plurality of user-selectable contact selectors 68, a plurality of user-selectable interaction type selectors 70, an interaction region 74, a description region 78, and/or a link to content 82.

With reference now also to FIGS. 2-9, descriptions of example use cases of system 10 for establishing a content sharing session will now be provided. FIGS. 2-9 illustrate examples of establishing a content sharing session and sharing content between a user computing device, such as user computing device 14, and one or more recipient computing devices according to the present disclosure. In one example and with reference to FIG. 2, a user may be using a photo viewing application to view photos in a viewing window 202 displayed on display 18 of user computing device 14. The user may desire to share a particular photo (content) with certain friends and have a real-time conversation about the photo.

In this example, the user may share with one or more friends content in the form of a photo 206 of the user cycling France. As noted, initially the user may be viewing the photo 206 via a photo viewing application. Before establishing a content sharing session that communicatively couples the user computing device with one or more recipient computing devices corresponding to one or more friends (recipients), the user may provide user selection input to the computing device 14 that selects the photo 206.

In one example, the user selection input may comprise a voice command that is received by a microphone of the computing device 14 and recognized by a speech recognition program. For example, the user may say, "Share this photo." In another example, the user selection input may comprise the user selecting a user-selectable sharing selector, such as a user-selectable sharing button 212, which causes the selection of the photo 206. In different examples the sharing button 212 may be displayed in the photo viewing application window 216 or in other locations on display 18. In another example the user selection input may comprise the user manipulating a cursor 220 via an input device, such as a mouse, to capture the photo 206 in a selection box 224. In other examples, user selection input may be provided in any other suitable manner using any other input devices and/or methods. For example, gesture recognition, eye gaze tracking, or any other suitable input methods may be utilized.

Figure 2:
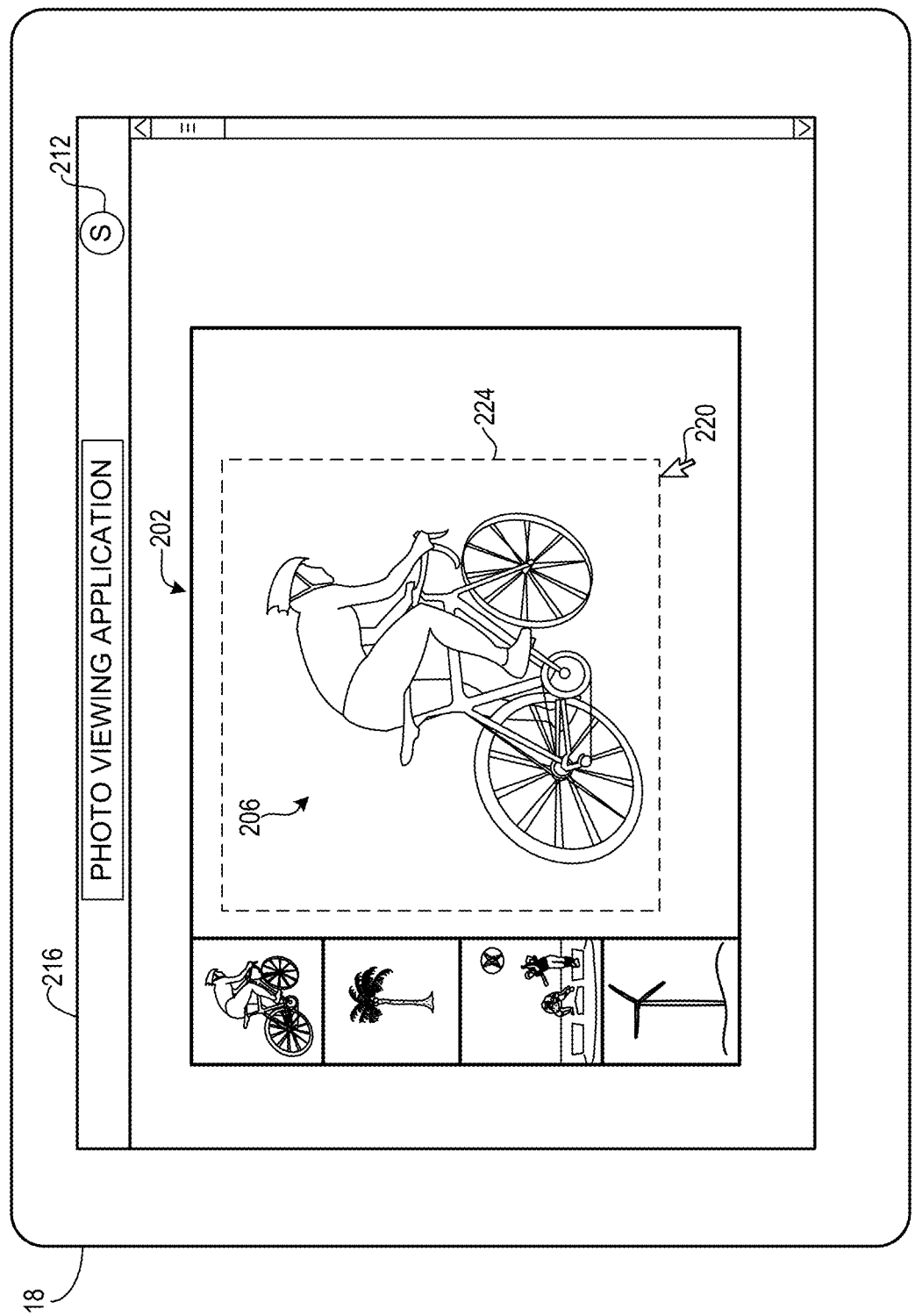
FIG. 2 shows example content displayed on the display of the user computing device of FIG. 1.
Figure 3:
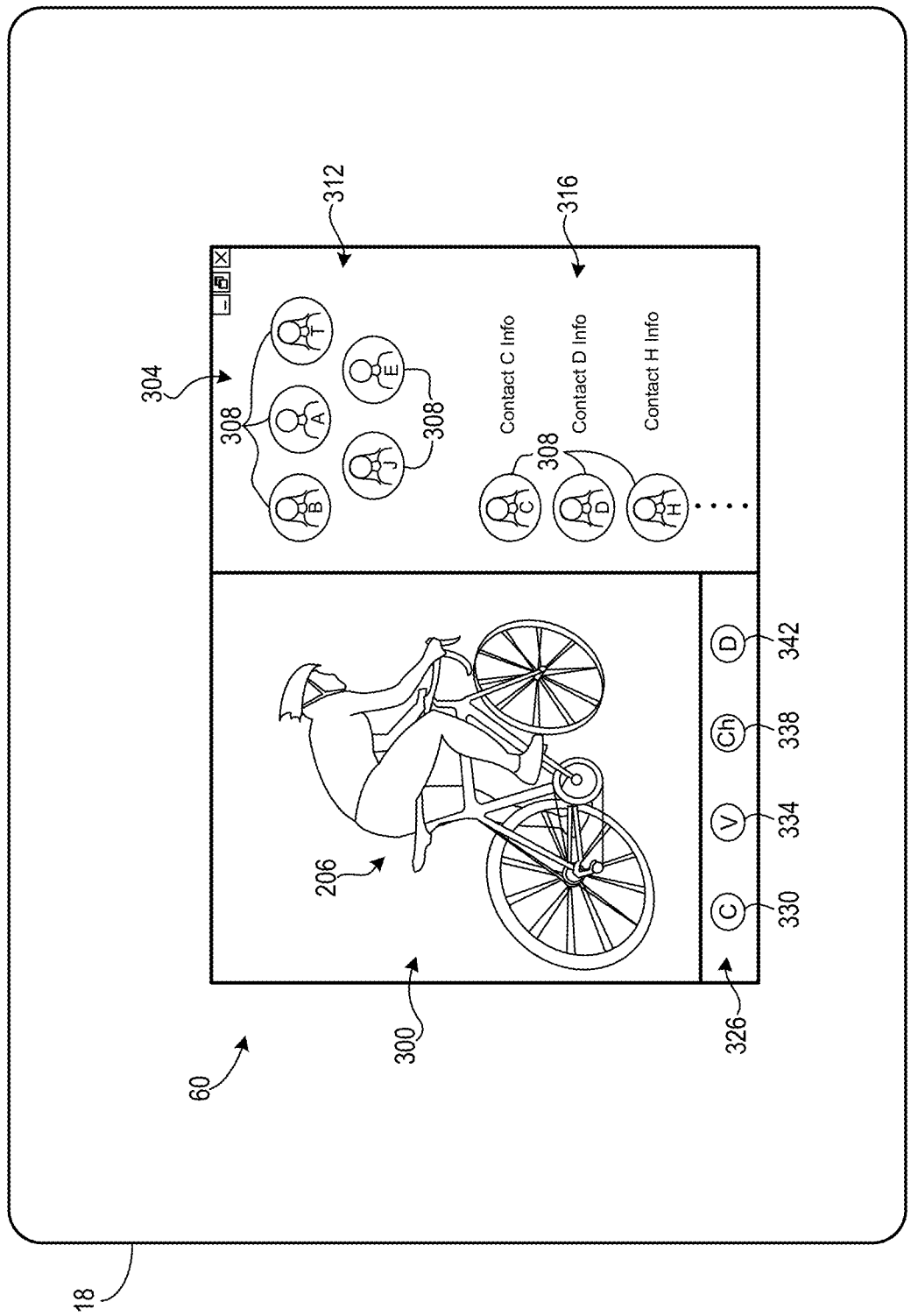
FIG. 3 shows an example content sharing window prior to establishing a content sharing session according to examples of the present disclosure.

In response to the user selection input, and with reference now to FIG. 3, the content sharing program 46 may generate on the display 18 a content sharing window 60 that includes the photo 206 displayed in a content display region 300. In this example, the content display region 300 is defined as the rectangular region in which photo 206 is enclosed. In other examples the content display region 300 may have other shapes and/or sizes. Additionally, in this example a portion (photo 206) of the content that is displayed in the viewing window 202 of FIG. 2 is selected and displayed in the content display region 300. In other examples, all content displayed on display 18 (such as an entire desktop) or other portions of displayed content (such as the entire viewing window 202 in FIG. 2) may be selected and displayed in the content display region 300.

As explained in more detail below, the content sharing window 60 may enable a user to quickly establish a content sharing session in which the photo 206 is shared with one or more recipients and a real-time dialogue among the user and the one or more recipients is facilitated. To enable the easy and quick creation of such an immediate and real-time dialogue, the content sharing window 60 may comprise a plurality of user-selectable interaction type selectors and a plurality of user-selectable contact selectors.

In the example of FIG. 3, the content sharing window 60 comprises a contacts region 304 in which the user-selectable contact selectors 308 are displayed. In various examples, each user-selectable contact selector 308 may correspond to a person, a group of people, or a social network. In some examples contact information, such as phone number(s), email addresses, home/work addresses, photos, etc., for each such person may be stored in mass storage 50 of user computing device 14 and/or in another database to which the user computing device has access.

In the example of FIG. 3 each user-selectable contact selector 308 comprises a photo of the person represented by such contact selector along with the first letter of the person's first name within a circle. In other examples, any suitable visual representation (an icon, name, etc.) that identifies the person associated with particular contact information may be utilized. Where a user-selectable contact selector 308 corresponds to a social network, any suitable visual representation that identifies the social network may be utilized.

In the example of FIG. 3, the contacts region 304 may comprise a quick contacts sub-region 312 and a contacts listing subregion 316. Upon generating the content sharing window 60, the content sharing program 46 may programmatically populate the quick contacts sub-region 312 with one or more user-selectable contact selectors 308. In this example, 5 user-selectable contact selectors 308 corresponding to friends Betty, Andy, Tyler, Julia, and Eddie are populated in quick contacts sub-region 312. In this manner, the user may quickly locate, select and share content with one or more of these friends. In other examples, any suitable number of user-selectable contact selectors 308 may be populated in the quick contacts sub-region 312.

In some examples the user may preselect one or more contacts from a contacts list or database to be automatically populated in the quick contacts sub-region 312 each time a content sharing window 60 is generated. In other examples, the content sharing program 46 may programmatically select one or more of the user's contacts for the quick contacts sub-region 312 based on predetermined criteria, such as frequency of previous selection by the user, presence on a social graph of the user, and/or other criteria.

The contacts listing sub-region 316 may comprise a full or partial listing of contacts from a contacts database. In the example of FIG. 3 and for each entry in the contacts listing sub-region 316, in addition to a photo and first letter of the person's first name, additional information associated with the contact may be displayed adjacent to the circular user-selectable contact selector 308. In other examples, no such additional information may be displayed.

In the example of FIG. 3, the content sharing window 60 comprises a communication selection region 326 in which user-selectable interaction type selectors are displayed. In this example, the content sharing window 60 comprises 4 user-selectable interaction type selectors—a call interaction type selector 330, a video interaction type selector 334, a chat interaction type selector 338, and a draw interaction type selector 342. In other examples, any suitable number and type of user-selectable interaction type selectors may be displayed in the communication selection region 326.

In some examples and as described in more detail below, upon selection of the call interaction type selector 330, content sharing program 46 may establish a content sharing session in which an audio communication channel is opened between user computing device 14 and one or more recipient computing devices that correspond to selected contact selector(s) 308, and the photo 206 is shared with the recipient computing device(s). Such audio communication channel may utilize voice over (VOIP) or other internet telephony protocol, public switched telephone networks (PSTN), cellular networks, or any other suitable audio communication protocol. In this manner, the user of user computing device 14 and the person(s) associated with the recipient computing device(s) may enjoy an audio conversation while viewing the photo 206 shared by the user.

In some examples such a content sharing session may be established upon a selection of a contact selector 308 after the call interaction type selector 330 has been selected.

In some examples and as described in more detail below, upon selection of the video interaction type selector 334, content sharing program 46 may establish a content sharing session in which a videotelephony (video and audio) communication channel is opened between user computing device 14 and one or more recipient computing devices that correspond to selected contact selector(s) 308, and the photo 206 is shared with the recipient computing device(s). Such videotelephony communication channel may utilize VOIP or other internet videotelephony protocol, PSTN, cellular networks, or any other suitable video communication protocol. In this manner, the user of user computing device 14 and the person(s) associated with the recipient computing device(s) may enjoy a video conference while viewing the photo 206 shared by the user.

In some examples such video communication channel may be opened upon a selection a contact selector 308 after the video interaction type selector 334 has been selected.

In some examples and as described in more detail below, upon selection of the chat interaction type selector 338, content sharing program 46 may establish a content sharing session in which an online chat channel providing instant messaging and/or multicast transmissions is opened between user computing device 14 and one or more recipient computing devices that correspond to selected contact selector(s) 308. Such online chat channel may utilize VOIP or other Internet protocol, PSTN, cellular networks, or any other suitable messaging protocol. In this manner, the user of user computing device 14 and the person(s) associated with the recipient computing device(s) may exchange text data in the form of text messages while viewing the photo 206 shared by the user.

In some examples such online chat channel may be opened upon a selection of a contact selector 308 after the chat interaction type selector 338 has been selected.

In some examples and as described in more detail below, upon selection of the draw interaction type selector 342, content sharing program 46 may establish a content sharing session in which an online annotation channel is opened between user computing device 14 and one or more recipient computing devices that correspond to selected contact selector(s) 308. Selecting the draw interaction type selector 342 enables the recipient(s) to add annotations, such as drawings and text, within the content display region 300. Such online annotation channel may utilize VOIP or other internet protocol, PSTN, cellular networks, or any other suitable data transmission protocol. In this manner, the user of user computing device 14 and the person(s) associated with the recipient computing device(s) may write, draw, doodle, etc. on and around the photo 206 shared by the user.

In some examples such online annotation channel may be opened upon a selection of a contact selector 308 after the draw interaction type selector 342 has been selected.

Figure 4:
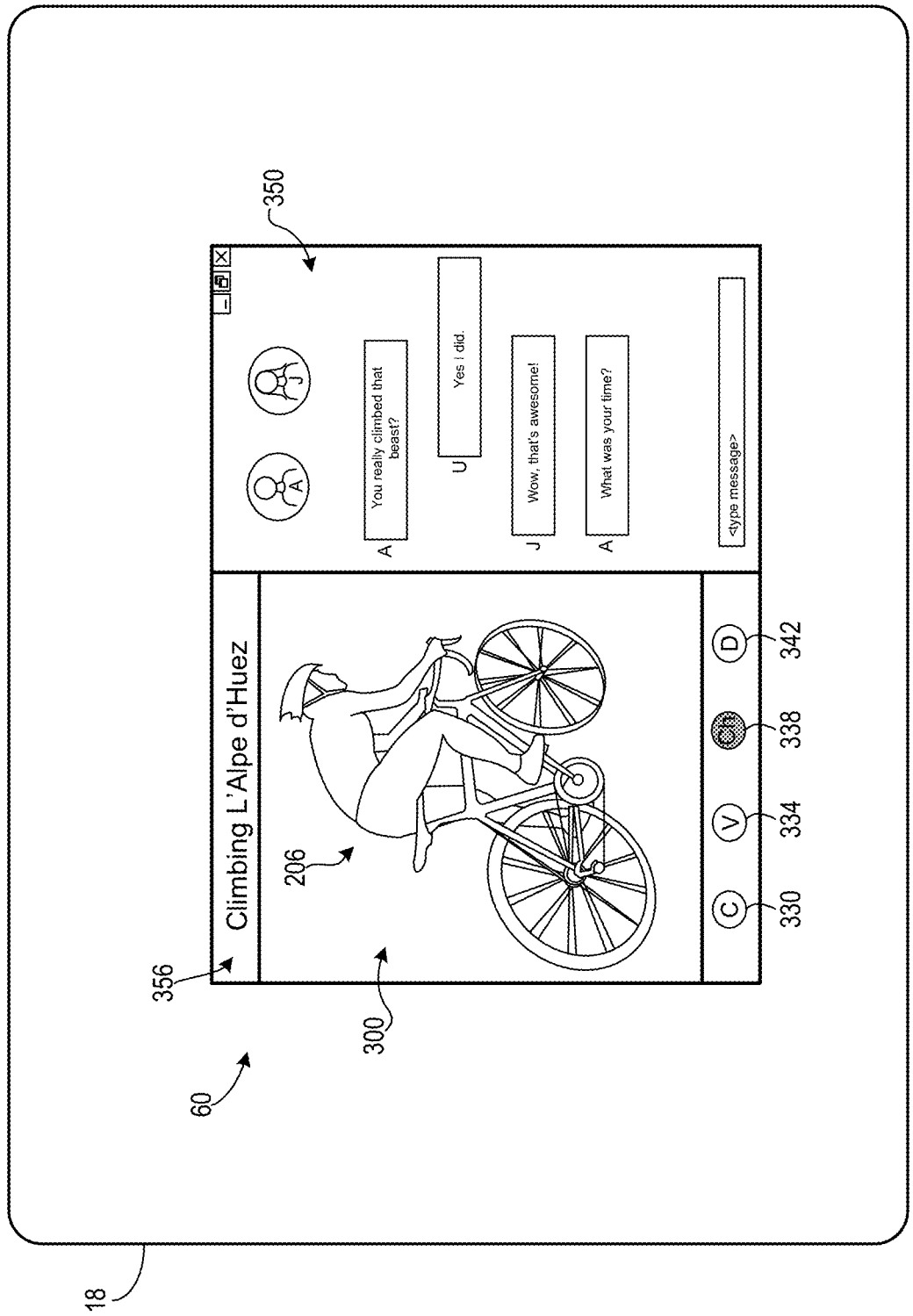
FIG. 4 shows the content sharing window of FIG. 3 during a content sharing session according to examples of the present disclosure.

In one example, user 26 may desire to share the photo 206 and exchange real-time text messages with friends Andy and Julia while they also view the photo. The user may provide user contact input that selects the two contact selectors 308 for Andy and Julia, and user interaction input that selects the chat interaction type selector 338. With reference now to FIG. 4, after receiving the user contact input and the user interaction input, an interaction region 350 may be displayed in the content sharing window 60. Recipient input, such as text messages received from Andy and Julia, as well as the user's text messages to Andy and Julia may be displayed in the interaction region 350.

The recipient computing devices of Andy and Julia may similarly display the photo 206 and text messages received from the other two participants. For example, each recipient may use a recipient computing device to view a similar content sharing window 60 that comprises the shared photo 206 and an interaction region displaying the exchanged text messages.

In some examples, the content sharing window 60 may include a description region 356 in which a topic associated with the content sharing session is displayed. In the present example, the topic is a caption describing the photo 206. Such topic may be generated from user input, retrieved from metadata associated with the content being shared, or otherwise programmatically generated by the content sharing program 46.

In some examples and with reference again to FIG. 3, the content sharing program 46 may be configured to display different contact selectors 308 based on which interaction type selector is selected. For example, the user 26 may regularly share content and exchange text messages with his two close friends, Andy and Julia. Accordingly, upon the user selecting the chat interaction type selector 338 in the communication selection region 326, the content sharing program 46 may programmatically populate the quick contacts sub-region solely with a contact selector 308 for Andy and a contact selector 308 for Julia, with the remaining on as being displayed in the contacts listing sub-region 316. In this manner, the user 26 may quickly select the two contact selectors 308 for Andy and Julia to initiate a content sharing session including text messaging with Andy and Julia.

In some examples the user 26 may input to the user computing device 14 a user preference that causes the two contact selectors 308 for Andy and Julia to be displayed when the user selects the chat interaction type selector 338

(or another interaction type selector). In some examples, the content sharing program 46 may use machine learning techniques or other suitable methods to determine that the user 26 regularly shares content and exchange text messages with Andy and Julia. In response to such determination, when the user selects the chat interaction type selector 338, the content sharing program 46 may programmatically populate the quick contacts subregion solely with a contact selector 308 for Andy and a contact selector 308 for Julia.

In another example, the user 26 may regularly share content and conduct videotelephony communications with his brother Eddie. Accordingly, upon the user selecting the video interaction type selector 334 in the content sharing window 60, the content sharing program 46 may programmatically populate the quick contacts sub-region solely with a contact selector 308 for Eddie, with the remaining contacts being displayed in the contacts listing sub-region 316.

In some examples the content sharing program 46 may be configured to enable different interaction type selectors based on different contact selector(s) 308 being selected. For example, where the user 26 regularly shares content and exchanges text messages with his sister Beatrice, upon the user selecting the contact selector 308 corresponding to Beatrice, the content sharing program 46 may programmatically enable the chat interaction type selector 338.

In some examples, enabling the chat interaction type selector 338 may comprise visually highlighting this selector for easy and quick selection by the user 26. In some examples, enabling the chat interaction type selector 338 may comprise displaying solely this selector and not displaying the other interaction type selectors in the selection region 326. In this manner, the user 26 may quickly locate and select the chat interaction type selector 338 to initiate a content sharing session including text messaging with Beatrice.

In some examples the user 26 may input a user preference that causes the chat interaction type selector 338 to be enabled when the user selects the contact selector 308 corresponding to Beatrice. In some examples, the content sharing program 46 may use machine learning techniques or other suitable methods to determine that the user 26 regularly shares content and exchange text messages with Beatrice in content sharing sessions. In response to such determination, when the user selects Beatrice's contact selector 308, the content sharing program 46 may programmatically enable the chat interaction type selector 338.

In some examples, the content sharing program 46 may use machine learning techniques or other suitable methods to analyze previous content sharing sessions in which user contact input selecting Beatrice's contact selector 308 was received by the user computing device 14 and text messages were exchanged. Using this information and at a subsequent time when the user selects the contact selector 308 corresponding to Beatrice, the content sharing program may programmatically establish a content sharing session with Beatrice in which the selected content is shared and text messages may be exchanged.

Figure 5:
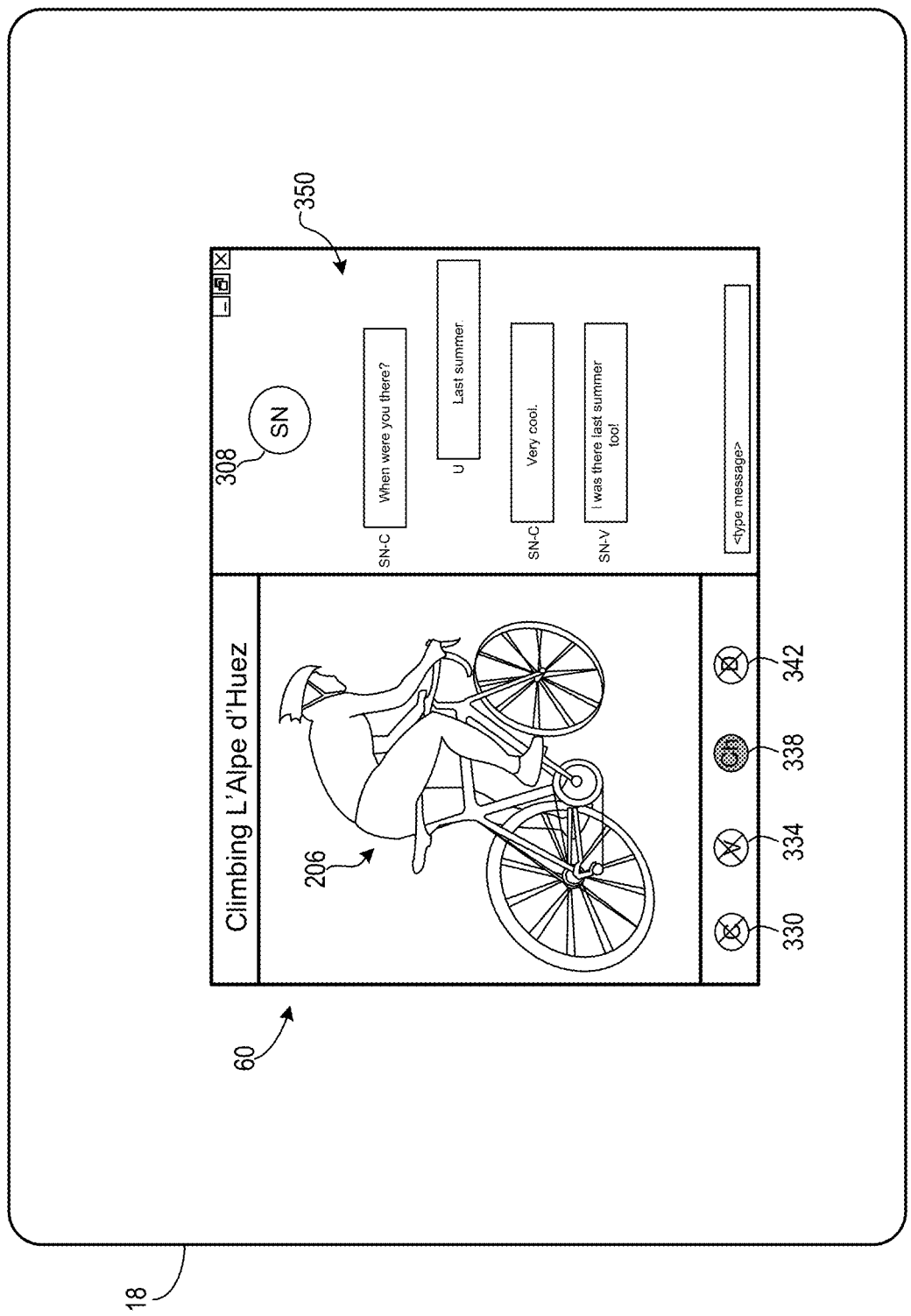
FIG. 5 shows the content sharing window of FIG. 3 during another content sharing session according to examples of the present disclosure.

In some examples the selected recipient may be a social network. With reference now to FIG. 5, the user 26 may select the chat interaction type selector 338 and a contact selector 308 corresponding to a social network to which the user belongs. In this example, members of the user's social graph (such as SN-C and SN-V) in the social network may receive the shared content (photo 206) and may exchange text messages with the user in the interaction region 350 during the content sharing session. In other examples, other members of the social network who are not on the user's social graph may receive the shared content and may change text messages with the user.

In some examples, upon the selection of a contact selector 308 corresponding to a social network, the content sharing program 46 may programmatically disable one or more of the interaction type selectors. For example, where the number of members of the user's social graph exceeds a predetermined threshold, the call interaction type selector 330, video interaction type selector 334, and/or draw interaction type selector 342 may be disabled.

In some examples, when a content sharing session that includes one or more members of a social network is terminated, the content sharing program may cause a post to be posted on the user's account at the social network. The post may include a portion or all of the content shared and the user and recipient input exchanged during the content sharing session.

Figure 6:
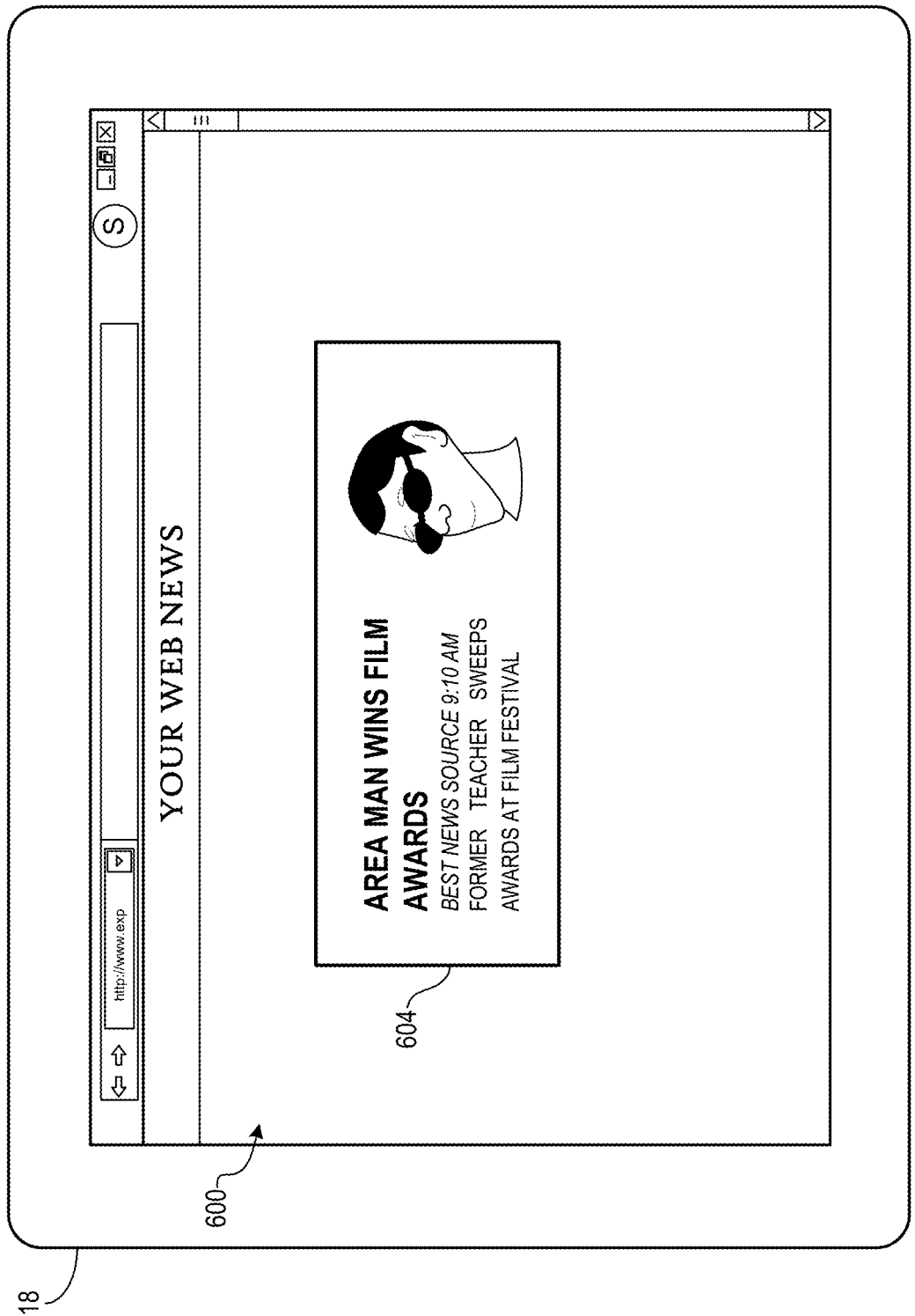
FIG. 6 shows example content displayed on the display of the user computing device of FIG. 1.
Figure 7:
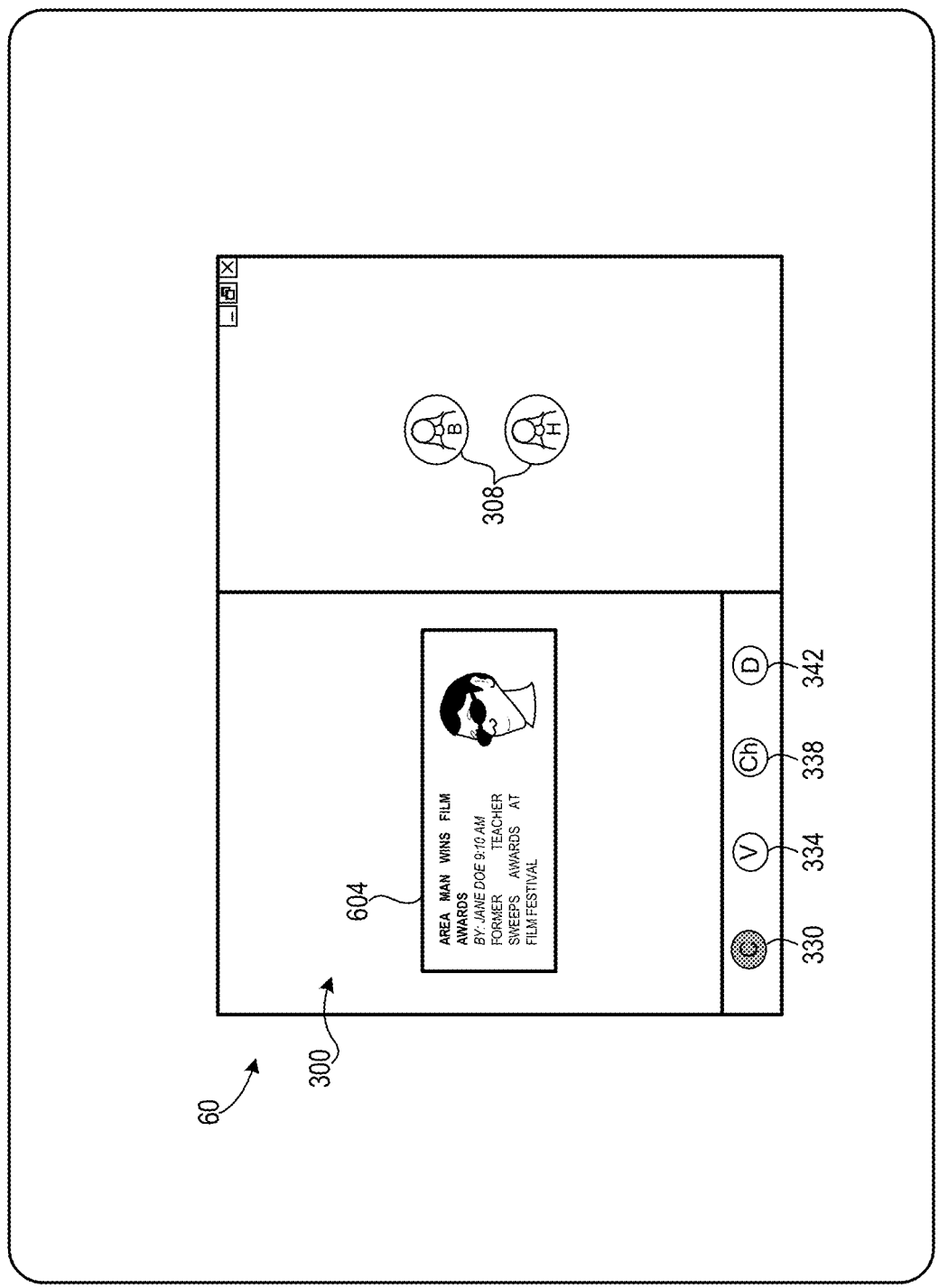
FIG. 7 shows a content sharing window during a content sharing session according to examples of the present disclosure.

With reference now to FIGS. 6 and 7, in some examples the user 26 may view a web page 600 displayed on display 18 via a browser. The web page 600 may include a portion 604 containing a news article that the user 26 would like to share and discuss with his sisters Beatrice and Harriet. The user 26 may select the news article portion 604 of web page 600. As shown in FIG. 7, the user 26 may then select contact selectors 308 corresponding to Beatrice and Harriet and the call interaction type selector 330 in the content sharing window.

Accordingly, a content sharing session among the user, Beatrice and Harriet is established in which the news article portion 604 is shared with Beatrice and Harriet and audio data is shared among the three computing devices associated with the three participants. For example, the user, Beatrice and Harriet may have a real-time conversation while each person views the news article portion 604. In this example, the content sharing window 60 does not include a description region.

Figure 8:
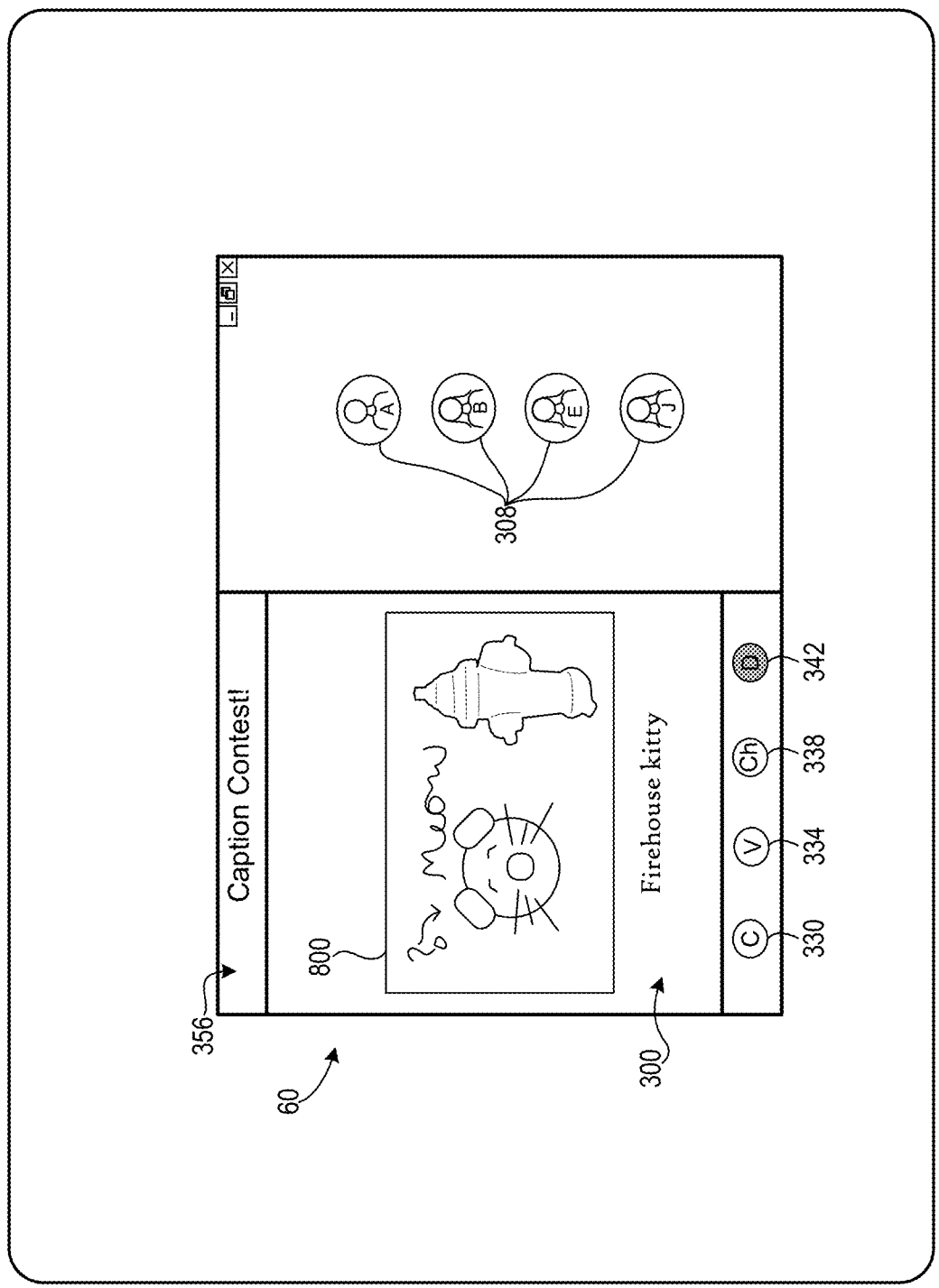
FIG. 8 shows a content sharing window during a content sharing session according to examples of the present disclosure.

With reference now to FIG. 8, in some examples the user 26 may desire to share content in a content sharing session in which participants may provide annotation data that annotates the content. In the example of FIG. 8, the user 26 selects a funny photo 800 for sharing. The user then selects contact selectors 308 corresponding to four friends and selects the draw interaction type selector 342 in the content sharing window.

Accordingly, a content sharing session among the user and his four friends is established in which annotation data is shared among the five computing devices associated with the five participants. In this example, a topic "Caption Contest!" is provided in the description region 356 by the user. The four friends via their recipient computing devices may provide annotation data to the user computing device 14, such as writing "Meow" on the photo 800, drawing a question mark and arrow on the photo, and adding text "Firehouse Kitty" in the content display region 300. The user 26 also may annotate the photo 800. Annotation data provided by the user and each recipient is displayed on each computing device of each of the recipients.

Figure 9:
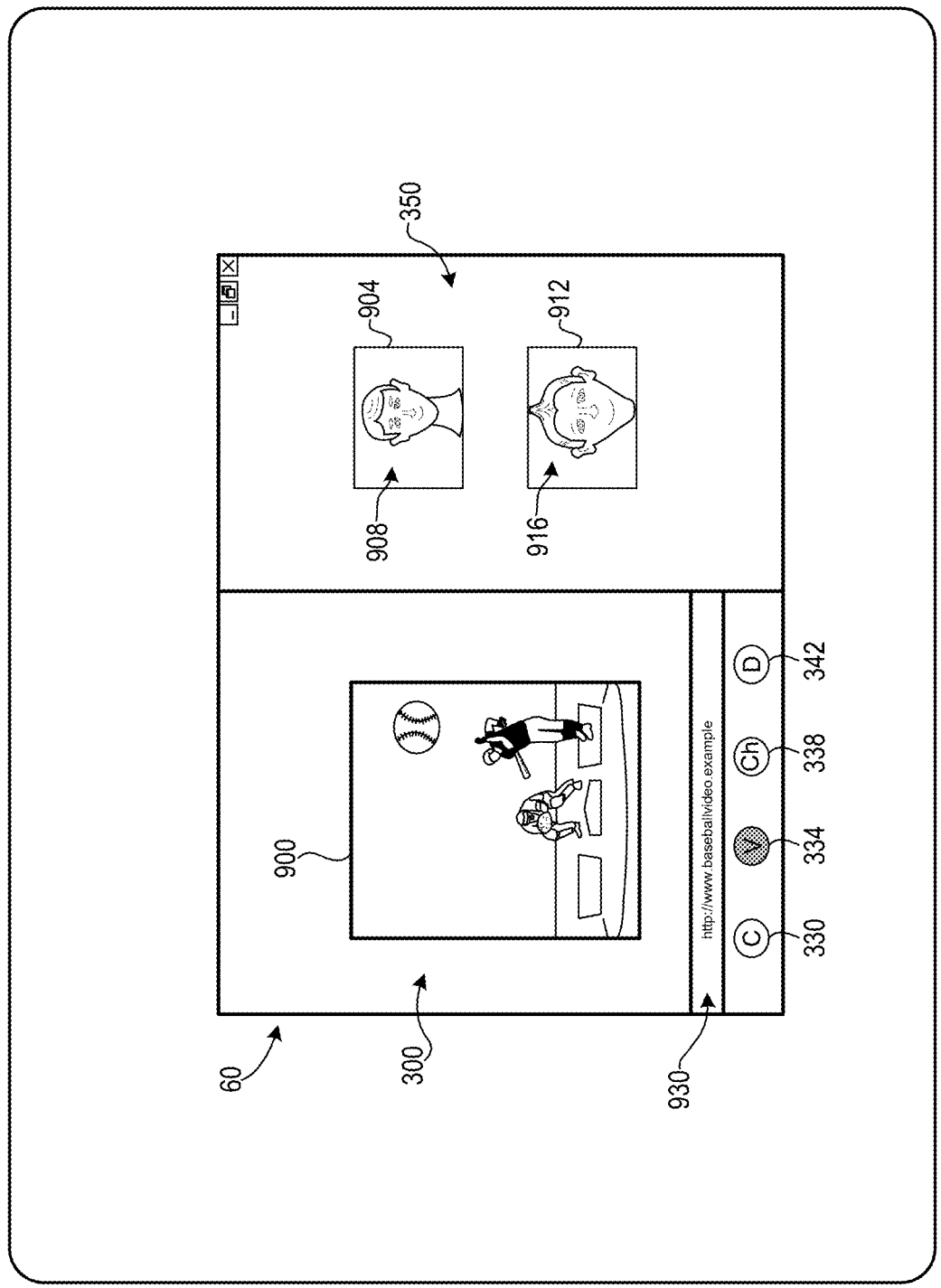
FIG. 9 shows a content sharing window during a content sharing session according to examples of the present disclosure.

With reference now to FIG. 9, in some examples the user 26 may share content in a content sharing session that includes live video feeds from recipients. In the example of FIG. 9, the user 26 selects a video 900 of a baseball game for sharing. The video may be contained in a file located on the user computing device 14 or other computing device. The user then selects contact selectors corresponding to two friends and the video interaction type selector 334 in the content sharing window 60.

Accordingly, a content sharing session among the user and his two friends is established. In this content sharing session, the interaction region 350 includes a first inset video window 904 that displays a first live video stream 908 of the first selected friend, and a second inset video window 912 that displays second live video stream 916 of the second selected friend. The recipient computing devices of each of the two friends may display the shared video 900 along with two inset video windows displaying live video streams of the user and the other participant.

In this example, the content sharing program 46 is configured to provide to each of the two recipient, computing devices a link the video 900. As shown in FIG. 9, in one example a link in the form of a URL corresponding to a source of the baseball video 900 may be displayed in a content source region 930 of the content sharing window 60. The URL may similarly be displayed with the video 900 on the recipients computing devices. In other examples, such a link may comprise a file location, such as a database location, or any other suitable locator.

Figure 10A:
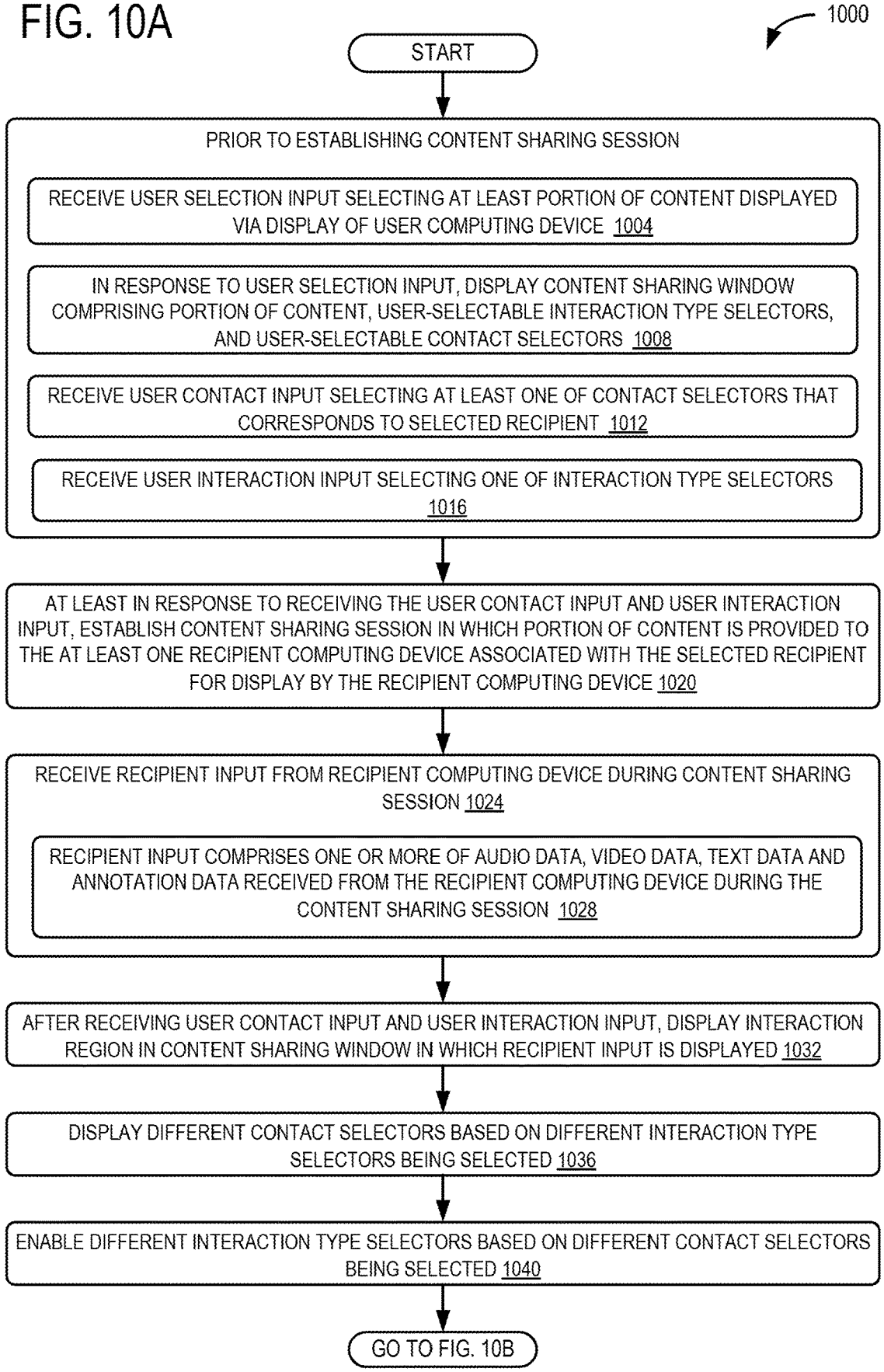
FIGS. 10A and 10B show a method for establishing a content sharing session according to examples of the present disclosure.
Figure 10B:
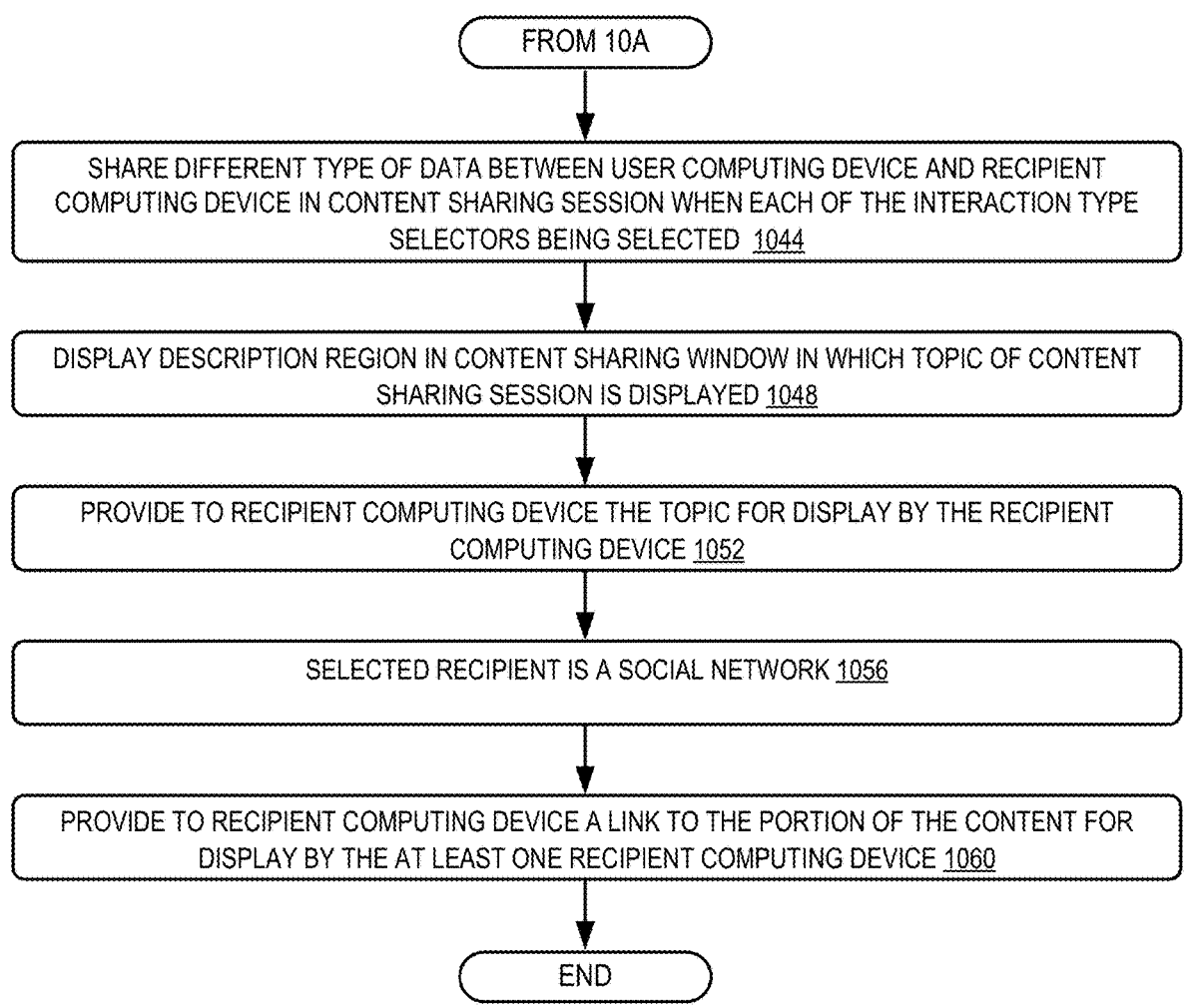

FIGS. 10A and 10B illustrate a flow chart of a method 1000 for establishing a content sharing session between a user computing device and at least one recipient computing device according to an example of the present disclosure. The following description of method 1000 is provided with reference to the software and hardware components described above and shown in FIGS. 1-9. It will be appreciated that method 1000 also may be performed in other contexts using other suitable hardware and software components.

With reference to FIG. 10A, the method 1000 may include, prior to establishing the content sharing session: at 1004 receiving user selection input selecting at least a portion of content displayed via a display of the user computing device; at 1008 in response to the user selection input, displaying via the display a content sharing window comprising the portion of the content, a plurality of user-selectable interaction type selectors, and a plurality of user-selectable contact selectors; at 1012 receiving user contact input selecting at least one of the user-selectable contact selectors that corresponds to a selected recipient; and at 1016 receiving user interaction input selecting one of the user-selectable interaction type, selectors. At 1020 the method 1000 may include, at least in response to receiving the user contact input and the user interaction input, establishing the content sharing session in which the portion of the content is provided to the at least one recipient computing device that is associated with the selected recipient for display.

At 1024 the method 1000 may include receiving recipient input from the at least one recipient computing device during the content sharing session. At 1028 the recipient input may comprise one or more of audio data, video data, text data and annotation data received from the recipient computing device during the content sharing session. At 1032 the method 1000 may include, after receiving the user contact input and the user interaction input, displaying an interaction region in the content sharing window in which the recipient input is displayed. At 1036 the method 1000 may include displaying different contact selectors based on different interaction type selectors being selected. At 1040 the method 1000 may include enabling different interaction type selectors based on different contact selectors being selected.

With reference now to FIG. 10B, at 1044 the method 1000 may include sharing a different type of data between the user computing device and the at least one recipient computing device in the content sharing session when each of the interaction type selectors is selected. At 1048 the method 1000 may include displaying a description region in the content sharing window in which a topic of the content sharing session is displayed. At 1052 the method 1000 may include providing to the at least one recipient computing device the topic for display by the at least one recipient computing device. At 1056 the selected recipient may be a social network. At 1060 the method 1000 may include providing to the at least one recipient computing device a link to the portion of the content for display by the at least one recipient computing device.

It will be appreciated that method 1000 is provided by way of example and is not meant to be limiting. Therefore, it is to be understood that method 1000 may include additional and/or alternative steps relative to those illustrated in FIGS. 10A and 10B. Further, it is to be understood that method 1000 may be performed in any suitable order. Further still, it is to be understood that one or more steps may be omitted from method 1000 without departing from the scope of this disclosure.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
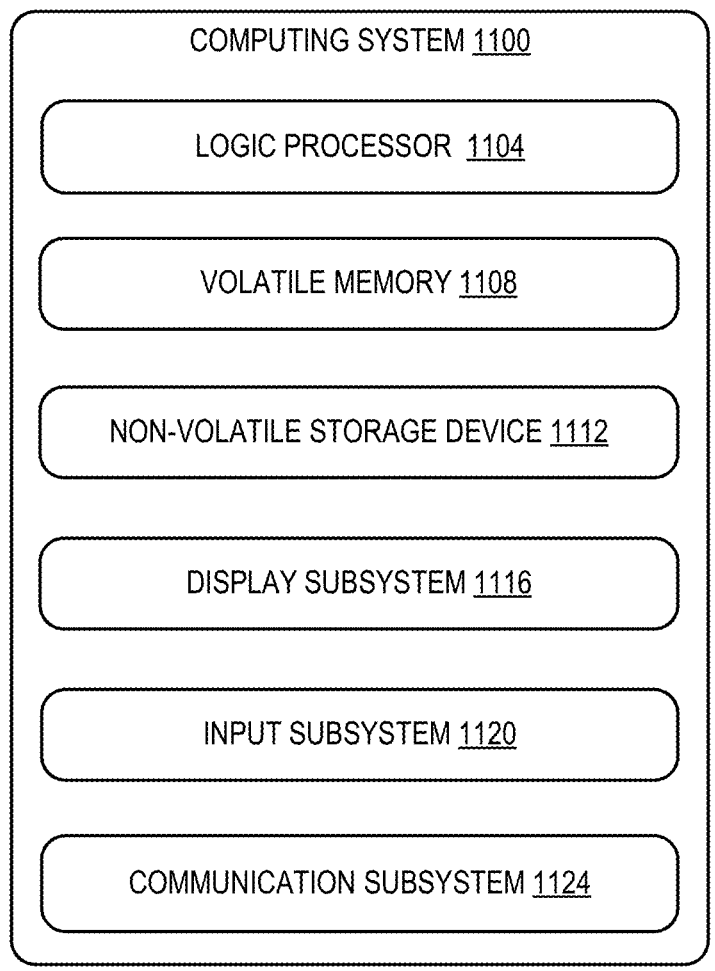
FIG. 11 schematically shows a computing system according to examples of the present disclosure.

FIG. 11 schematically shows a non-limiting embodiment of a computing system 1100 that can enact one or more of the methods and processes described above. Computing system 1100 is shown in simplified form. User computing device and recipient computing devices described above may take the form of computing system 1100.

Computing system 1100 includes a logic processor 1104, volatile memory 1108, and a non-volatile storage device 1112. Computing system 1100 may optionally include a display subsystem 1116, input subsystem 1120, communication subsystem 1124, and/or other components not shown in FIG. 11.

Logic processor 1104 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 1104 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 1104 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 1104 may be virtualized and executed by remotely accessible, networked computing devices configured in a cloud-computing configuration. In such a case, these virtualized aspects may be run on different physical logic processors of various us different machines.

Volatile memory 1108 may include physical devices that include random access memory. Volatile memory 1108 is typically utilized by logic processor 1104 to temporarily store information during processing of soft instructions. It will be appreciated that volatile memory 1108 typically does not continue to store instructions when power is cut to the volatile memory.

Non-volatile storage device 1112 includes one or more physical devices configured to hold instructions executable by the logic processors to implement the methods and processes described herein. When such methods and processes are implemented, the state of non-volatile storage device 1112 may be transformed—e.g., to hold different data.

Non-volatile storage device 1112 may include physical devices that are removable and/or built-in. Non-volatile storage device 1112 may include optical memory (CD, DVD, HD-DVD, Blu-Ray Disc, etc.), semiconductor memory (ROM, EPROM, EEPROM, FLASH memory, etc.), and/or magnetic memory (hard-disk drive, floppy-disk drive, tape drive, MRAM, etc.), or other mass storage device technology. Non-volatile storage device 1112 may include nonvolatile, dynamic, static, read/write, read-only, sequential-access, location-addressable, file-addressable, and/or content-addressable devices. It will be appreciated that non-volatile storage device 1112 is configured to hold instructions even when power is cut the non-volatile storage device.

Aspects of logic processor 1104, volatile memory 1108, and non-volatile storage device 1112 may be integrated together into one or more hardware-logic components. Such hardware-logic components may included field-programmable gate arrays (FPGAs), program- and application-specific integrated circuits (PASIC ASICs), program- and application-specific standard products (PSSP/ASSPs), system-on-a-chip (SOC), and complex programmable logic devices (CPLDs), for example.

The term "program" may be used to describe an aspect of computing system 1100 implemented to perform a particular function. In some cases, a program may be instantiated via logic processor 1104 executing instructions held by non-volatile storage device 1112, using portions of volatile memory 1108. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 1116 may be used to present a visual representation of data held by non volatile storage device 1112 and/or received from another computing device or other source. As the herein described methods and processes change the data held by the non-volatile storage device, and thus transform the state of the non-volatile storage device, the state of display subsystem 1116 may likewise be transformed to visually represent changes in the underlying data. Display subsystem 1116 may include one or more display devices utilizing virtually any type of technology. Such display devices may be combined with logic processor 1104, volatile memory 1108, and/or non-volatile storage device 1112 in a shared enclosure, or such display devices may be peripheral display devices.

When included, input subsystem 1120 may comprise or interface with one or more user-input devices. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; electric-field sensing componentry for assessing brain activity; and/or any other suitable sensor.

When included, communication subsystem 1124 may be configured to communicatively couple computing system 1100 with one or more other computing devices. Communication subsystem 1124 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

The following paragraphs provide additional support for the claims of the subject application. One aspect provides a system for establishing a content sharing session, the system comprising: a user computing device comprising a processor and a display configured to display content; and a content sharing program executable by the processor and configured to: prior to establishing the content sharing session: receive user selection input selecting at least a portion of the content displayed on the display; in response to the user selection input, generate a content sharing window comprising the portion of the content, a plurality of user-selectable interaction type selectors, and a plurality of user-selectable contact selectors: receive user contact input selecting at least one of the user-selectable contact selectors that corresponds to a selected recipient; and receive user interaction input selecting one of the user-selectable interaction type selectors; at least in response to receiving the user contact input and the user interaction input, establish the content sharing session in which the portion of the content is provided to at least one recipient computing device associated with the selected recipient for display; and receive recipient input from the at least one recipient computing device during the content sharing session. The system may additionally or alternatively include, wherein the content sharing program is further configured to, after receiving the user contact input and the user interaction input, display an interaction region in the content sharing window in which the recipient input is displayed. The system may additionally or alternatively include, wherein the content sharing program is further configured to display different contact selectors based on different interaction type selectors being selected. The system may additionally or alternatively include, wherein the content sharing program is further configured to enable different interaction type selectors based on different contact selectors being selected. The system may additionally or alternatively include, wherein each of the interaction type selectors is configured to cause sharing of a different type of data between the user computing device and the at least one recipient computing device in the content sharing session. The system may additionally or alternatively include, wherein the recipient input comprises one or more of audio data, video data, text data and annotation data received from the recipient computing device during the content sharing session. The system may additionally or alternatively include, wherein the content sharing program is further configured to display a description region in the content sharing window in which a topic of the content sharing session is displayed. The system may additionally or alternatively include, wherein the selected recipient is a social network. The system may additionally or alternatively include, wherein the content sharing program is further configured to provide to the at least one recipient computing device a link to the portion of the content for display by the at least one recipient computing device.

Another aspect provides a method for establishing a content sharing session between a user computing device and at least one recipient computing device, the method comprising: prior to establishing the content sharing session: receiving user selection input selecting at least a portion of content displayed via a display of the user computing device; in response to the user selection input, displaying via the display a content sharing window comprising the portion of the content, a plurality of user-selectable interaction type selectors, and a plurality of user-selectable contact selectors; receiving user contact input selecting at least one of the user-selectable contact selectors that corresponds to a selected recipient; and receiving user interaction input selecting one of the user-selectable interaction type selectors; at least in response to receiving the user contact input and the user interaction input, establishing the content sharing session in which the portion of the content is provided to the at least one recipient computing device that is associated with the selected recipient for display and receiving recipient input from the at least one recipient computing device during the contend sharing session. The method may additionally or optionally include, after receiving the user contact input and the user interaction input, displaying an interaction region in the content sharing window in which the recipient input is displayed. The method may additionally or optionally include, displaying different contact selectors based on different interaction type selectors being selected. The method may additionally or optionally include enabling different interaction type selectors based on different contact selectors being selected. The method may additionally or optionally include sharing a different type of data between the user computing device and the at least one recipient computing device in the content sharing session when each of the interaction type selectors is selected. The method may additionally or optionally include, wherein the recipient input comprises one or more of audio data, video data, text data and annotation data received from the recipient computing device during the content sharing session. The method may additionally or optionally include, displaying a description region in the content sharing window in which a topic of the content sharing session is displayed; and providing to the at least one recipient computing device the topic for display by the at least one recipient computing device. The method may additionally or optionally include, wherein the selected recipient is a social network. The method may additionally or optionally include providing to the at least one recipient computing device a link to the portion of the content for display by the at least one recipient computing device.

Another aspect provides a system for establishing a content sharing session, the system comprising: a user computing device comprising a processor and a display configured to display content; and a content sharing program executable by the processor and configured to: prior to establishing the content sharing session: receive user selection input selecting at least a portion of the content displayed on the display; in response to the user selection input, generate a content sharing window comprising the portion of the content, a plurality of user-selectable interaction type selectors, and a plurality of user-selectable contact selectors; receive user contact input selecting at least one of the user-selectable contact selectors that corresponds to a selected recipient; and receive user interaction input selecting one of the user-selectable interaction type selectors; at least in response to receiving the user contact input and the user interaction input, establish the content sharing session in which the portion of the content is provided to at least one recipient computing device associated with the selected recipient for display; receive recipient input from the at least one recipient computing device during the content sharing session; and display the recipient input in an interaction region in the content sharing window. The system may additionally or alternatively include, wherein the content sharing program is further configured to display different contact selectors based on different interaction type selectors being selected.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for establishing a content sharing session, the system comprising:
 a user computing device comprising a processor and a display configured to display content; and
 a content sharing program executable by the processor and configured to:
  prior to establishing the content sharing session that communicatively couples the user computing device with at least one recipient computing device:
   receive user selection input selecting at least a portion of the content displayed on the display;
   in response to the user selection input selecting at least a portion of the content displayed on the display, display a content sharing window comprising (1) the portion of the content, (2) a plurality of user selectable interaction type selectors, and (3) a plurality of user-selectable contact selectors;
   receive user contact input selecting at least one of the user-selectable contact selectors that corresponds to a selected recipient; and
   receive user interaction input selecting one of the user-selectable interaction type selectors;
  at least in response to receiving the user contact input and the user interaction input, establish the content sharing session in which the portion of the content is provided to the at least one recipient computing device, wherein the at least one recipient computing device is associated with the selected recipient;
  after receiving the user contact input and the user interaction input, display an interaction region in the content sharing window;

receive recipient input from the at least one recipient computing device during the content sharing session, the recipient input including text data entered by the selected recipient; and display the recipient input including the text data entered by the selected recipient in the interaction region.

2. The system of claim 1, wherein the content sharing program is further configured to display different contact selectors based on different interaction type selectors being selected.

3. The system of claim 1, wherein the content sharing program is further configured to enable different interaction type selectors based on different contact selectors being selected.

4. The system of claim 1, wherein each of the interaction type selectors is configured to cause sharing of a different type of data between the user computing device and the at least one recipient computing device in the content sharing session.

5. The system of claim 1, wherein the recipient input further comprises one or more of audio data, video data, and annotation data received from the recipient computing device during the content sharing session.

6. The system of claim 1, wherein the content sharing program is further configured to display a description region in the content sharing window in which a topic of the content sharing session is displayed.

7. The system of claim 1, wherein the selected recipient is a social network.

8. The system of claim 1, wherein the content sharing program is further configured to provide to the at least one recipient computing device a link to the portion of the content for display by the at least one recipient computing device.

9. A method for establishing a content sharing session between a user computing device and at least one recipient computing device, the method comprising:
   prior to establishing the content sharing session that communicatively couples the user computing device with the at least one recipient computing device:
      receiving user selection input selecting at least a portion of content displayed via a display of the user computing device;
      in response to the user selection input selecting at least a portion of the content displayed on the display, displaying via the display a content sharing window comprising (1) the portion of the content, (2) a plurality of user-selectable interaction type selectors, and (3) a plurality of user-selectable contact selectors;
      receiving user contact input selecting at least one of the user-selectable contact selectors that corresponds to a selected recipient; and
      receiving user interaction input selecting one of the user-selectable interaction type selectors;
   at least in response to receiving the user contact input and the user interaction input, establishing the content sharing session in which the portion of the content is provided to the at least one recipient computing device, wherein the at least one recipient computing device is associated with the selected recipient;
   after receiving the user contact input and the user interaction input, display an interaction region in the content sharing window;
   receiving recipient input from the at least one recipient computing device during the content sharing session, the recipient input including text data entered by the selected recipient; and
   displaying the recipient input including the text data entered by the selected recipient in the interaction region.

10. The method of claim 9, further comprising displaying different contact selectors based on different interaction type selectors being selected.

11. The method of claim 9, further comprising enabling different interaction type selectors based on different contact selectors being selected.

12. The method of claim 9, further comprising sharing a different type of data between the user computing device and the at least one recipient computing device in the content sharing session when each of the interaction type selectors is selected.

13. The method of claim 9, wherein the recipient input further comprises one or more of audio data, video data, and annotation data received from the recipient computing device during the content sharing session.

14. The method of claim 9, further comprising:
   displaying a description region in the content sharing window in which a topic of the content sharing session is displayed; and
   providing to the at least one recipient computing device the topic for display by the at least one recipient computing device.

15. The method of claim 9, wherein the selected recipient is a social network.

16. The method of claim 9, further comprising providing to the at least one recipient computing device a link to the portion of the content for display by the at least one recipient computing device.

17. A system for establishing a content sharing session, the system comprising:
   a user computing device comprising a processor and a display configured to display content; and
   a content sharing program executable by the processor and configured to:
      prior to establishing the content sharing session that communicatively couples the user computing device with at least one recipient computing device:
         receive user selection input selecting at least a portion of the content displayed on the display;
         in response to receiving the user selection input selecting at least a portion of the content displayed on the display, display a content sharing window comprising (1) the portion of the content, (2) a plurality of user-selectable interaction type selectors, and (3) a plurality of user-selectable contact selectors;
         receive user contact input selecting at least one of the user-selectable contact selectors that corresponds to a selected recipient; and
         receive user interaction input selecting one of the user-selectable interaction type selectors;
      at least in response to receiving the user contact input and the user interaction input, establish the content sharing session in which the portion of the content is provided to the at least one recipient computing device, wherein the at least one recipient computing device is associated with the selected recipient;
      after receiving the user contact input and the user interaction input, display an interaction region in the content sharing window;

receive recipient input from the at least one recipient computing device during the content sharing session, the recipient input including text data entered by the selected recipient; and display the recipient input including text data entered by the selected recipient in the interaction region in the content sharing window.

18. The system of claim 17, wherein the content sharing program is further configured to display different contact selectors based on different interaction type selectors being selected.

* * * * *